United States Patent [19]

Langouet

[11] Patent Number: 5,085,518
[45] Date of Patent: Feb. 4, 1992

[54] BEARING AND SEAL ASSEMBLY

[75] Inventor: Luc Langouet, Milwaukee, Wis.

[73] Assignee: Vilter Manufacturing Corporation, Milwaukee, Wis.

[21] Appl. No.: 734,747

[22] Filed: Jul. 23, 1991

[51] Int. Cl.[5] .............................................. F16C 38/72
[52] U.S. Cl. .................................... 384/477; 384/489; 384/537; 415/201.1
[58] Field of Search ............... 384/477, 481, 489, 519, 384/537, 542, 583–585; 418/95, 201.1, 201.2, 104

[56] References Cited

U.S. PATENT DOCUMENTS

| | | | |
|---|---|---|---|
| 2,247,454 | 7/1941 | Thomson | 384/481 |
| 3,460,437 | 8/1969 | Roggenburk | 384/489 X |
| 4,412,705 | 11/1983 | Schreiner et al. | 384/584 |
| 4,465,446 | 8/1984 | Nemit, Jr. et al. | 418/201.1 |
| 4,557,679 | 12/1985 | Mori et al. | 418/201.1 |
| 4,579,513 | 4/1986 | Zimmern et al. | 418/201.2 X |
| 4,917,511 | 4/1990 | Katsube | 384/519 X |

Primary Examiner—Thomas R. Hannon
Attorney, Agent, or Firm—Nilles & Nilles SC

[57] ABSTRACT

A bearing and seal assembly for supporting a rotor for rotation about an axis in a rotor receiving bore of a rotating machine which is concentric to the axis of rotation. The bearing and seal assembly includes a non-rotatable bearing support member dimensioned to loosely fit inside the rotor bore so as to be radially movable relative to the axis of rotation. A bearing receiving portion is provided on the bearing support that holds a bearing which mounts the rotor on the bearing support member. A seal is nonrotatably mounted on the bearing support and has an outer peripheral portion dimensioned to have a close tolerance nonrotating fit with an inner peripheral surface of the rotor bore; an inner peripheral portion; and an nonrotating sealing surface dimensioned to have a close tolerance sealing relationship with a rotating sealing surface on the rotor. The bearing support has a radial dimension that is less than the radial dimension between a radial outer portion and an inner peripheral surface of the bore to permit radial adjustment of the rotor axis to locate a rotor sealing surface in concentricity with the nonrotating sealing surface of the seal. A releasable clamping device is provided for securing the members together to lock the rotor and seal surfaces in the position of concentricity.

10 Claims, 2 Drawing Sheets

BEARING AND SEAL ASSEMBLY

BACKGROUND OF THE INVENTION

1. Field of the Invention

This invention relates to a bearing and seal assembly for supporting a rotor in the bore of a rotating machine and more particularly to a bearing and seal assembly that provides for adjustment of the rotor into a desired concentricity with the bore.

2. Description of the Prior Art

In rotary machines such as screw compressors, a rotor is rotatably mounted in a housing bore on bearings carried by a bearing support and a gap exists between the rotor and the housing bore. The rotor and housing provide a high pressure cavity and a low pressure cavity. A seal is provided to prevent gas flow from the high to the low pressure cavity.

Installation of a seal in the gap has the effect of creating two separate gaps which will be referred to as (1) the running gap (C1, FIG. 2) which is between the rotor and housing, and (2) the sealing gap (C2, FIG. 2) which is between the interfacing sealing surfaces of the seal and rotor.

The bearing support functions to center and support the rotor in the housing bore. The bearing and seal support affects three parameters which relate to the efficiency of the compressor. First, the width of these two gaps must be as small as possible; second, the width of these two gaps should remain as constant and concentric as possible during operation; and third, the volume of gas flow through the seal must be as small as possible. The prior art has not fully satisfied these three parameters because the components of known bearing and seal assemblies require a plurality of cumulative tolerances that must be accommodated. For example, in a typical bearing support and seal assembly, the components have seven dimensional tolerances which are cumulative. In addition, some components have different thermal expansion and when thermal expansion is also factored in, an overall radial tolerance of 0.010 can exist. In practice, to accommodate this overall tolerance the running and sealing gaps must be slightly increased. However, if the sealing gap is too large and the seal does not properly seal, it will reduce the overall efficiency of the compressor and increase horsepower requirements. Such compressors have horsepower requirements in the 200 hp to 600 hp range and currently annual operating costs for energy are in the range of $300 to $500 per each rated horsepower of the compressor. Therefore, if the gap and seal assembly is more effective, the overall efficiency of the compressor can be improved which means that the horsepower requirements for a given gas output can be reduced resulting in significant savings.

In practice, the seal will be designed to have the smallest possible sealing gap. In an effort to minimize problems, the seal is made of aluminum even though steel or cast iron is preferred. Aluminum improves the self-adjustment qualities of the seal relative the rotor and the sealing gap is designed to be wider than really desired for the highest possible overall compressor efficiency.

During the seal self-adjustment period, the seal may have an important friction contact and such friction can cause the rotor to overheat and expand more than the rotor running gap C1 which may cause the rotor to contact the housing resulting in seizing.

However, aluminum is not the most desirable seal material because the dimension of an aluminum seal is difficult to control during manufacture. The seal dimension will change in response to change in temperature making machining to close tolerances more difficult. In addition, all of the other components on the bearing and seal assembly must be machined to very close tolerances in order to minimize the sum of the concentric tolerances and this further increases manufacturing costs.

Problems also exist with known designs relating to the subassembly of bearing supports and seal components and their subsequent final installation in the rotor housing. The bearing support in prior designs functions to provide concentricity of the rotor with the bore. This need for concentricity requires that the support be precisely machined to provide a close tolerance in the rotor bore. Further, the plurality of very close tolerance components make assembly a very time-consuming and costly process which further adds to the cost of the compressor.

SUMMARY OF THE INVENTION

In accord with the present invention, there is provided a bearing and seal assembly for supporting a rotor that has a rotating sealing surface. The rotor is supported for rotation about an axis in a rotating machine of the type that includes a housing having a rotor receiving bore defined by an inner peripheral surface which is concentric to the axis of rotation. The bearing and seal assembly comprises: a nonrotatable support means that has a bearing support member dimensioned to loosely fit inside the inner peripheral surface of the rotor bore so as to be radially movable relative to the axis of rotation; a bearing receiving portion on the bearing support; a bearing means on the bearing receiving portion to mount the rotor for rotation on the bearing support member and including a radially outer bearing portion; a seal receiving seat on the bearing support; and a seal nonrotatably mounted on the seat in sealing relation thereto and having an outer peripheral portion dimensioned to have a close tolerance nonrotating fit with the inner peripheral surface of the rotary receiving bore, an inner peripheral portion and a nonrotating sealing surface dimensioned to have a close tolerance sealing relationship with the rotating sealing surface of the rotor. The bearing support member has a radial dimension that is less than the radial dimension between the radial outer bearing portion and the inner peripheral surface of the bore to permit radial adjustment of the rotor axis to locate the rotor sealing surface in concentricity with the nonrotating sealing surface of the seal and a releasable clamping means for securing said members together to lock said rotor and seal surfaces in said position of concentricity.

Preferably the inner peripheral portion of said seal member will include a radial flange that extends radially inward into the bore and the outer peripheral portion of the seal member will include an axial flange extending axially of the bore with the nonrotating sealing surface of the seal being on the axial flange. The bearing support member includes a hub having a rim portion that extends radially outward from the hub. The releasable clamping means may comprise a plurality of axial apertures extending axially through the hub rim, a plurality of threaded bores in the seal member, and a plurality of cap screws each having a shank dimensioned to be loosely received in the axial apertures to provide radial play therebetween and a threaded portion to be received in the threaded bore of the seal. Radial play between each cap screw shank and its associated aperture will allow the bearing support member to be adjusted radially relative to the seal member and into concentricity before the cap screws are finally tightened so that the seal member will support the bearing member and rotor.

BRIEF DESCRIPTION OF THE DRAWINGS

Referring to the drawings.

DESCRIPTION OF THE PREFERRED EMBODIMENT

Figure 1:
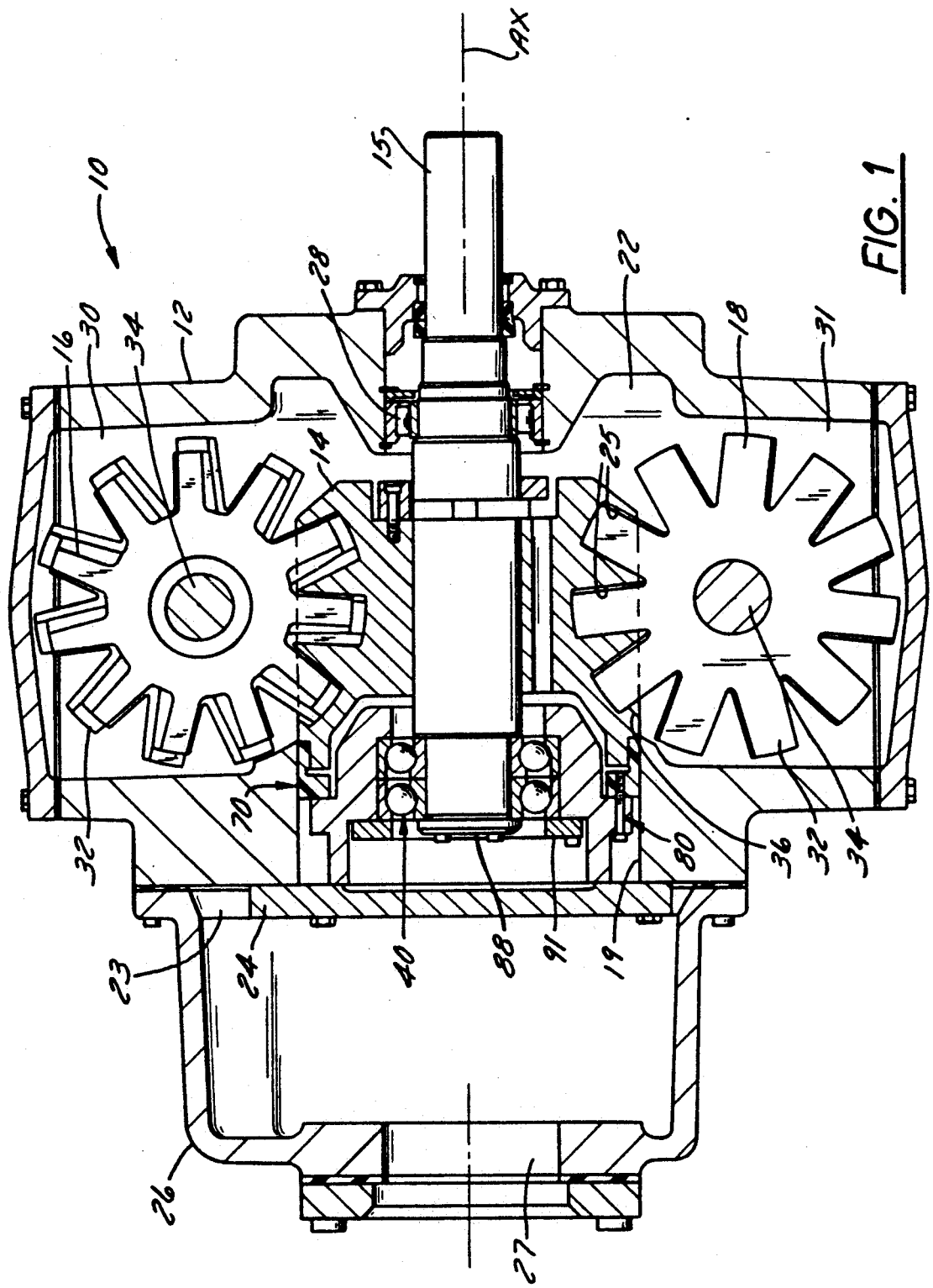
FIG. 1 is a cross-sectional view of a compressor embodying a bearing and seal assembly for supporting a rotor in accordance with the present invention.

Referring to FIG. 1, the number 10 designates a rotary screw gas compressor generally comprising a compressor housing 12, a single main rotor 14 mounted for rotation in housing 12 and driven by means of an electric motor, not shown, a pair of star-shaped gate or star rotor 16, 18 mounted for rotation in the housing 12 and engaged with the main rotor 14.

The compressor housing 12 includes a cylindrical bore 19 in which the main rotor 14 is rotatably mounted. Bore 19 is open at the suction end 22 of the compressor and is closed at the discharge end 23 of the bore by a removable wall 24 and a discharge end casing 26 having a high pressure outlet 27. The main rotor 14, which is generally cylindrical, has a plurality of helical grooves 25 formed therein defining compression chambers. The main rotor 14 also is provided with a rotor shaft 15 which is rotatably supported at the suction end 22 in housing 12 by a bearing 28 and at its opposite end 23 by a bearing and seal assembly 40, which will be further described, for rotation about an axis of rotation AX.

The compressor housing 12 further includes spaces 30, 31 therein in which the star rotors 16, 18 are rotatably mounted, and the star rotors 16, 18 are located on opposite sides of main rotor 14. Each star rotor 16, 18 has a plurality of gear teeth 32 and is provided with a rotor shaft 34 which is rotatably supported at opposite ends on bearing assemblies, not shown, in housing 12. Each star rotor 16, 18 rotates on an axis which is perpendicular to and spaced from the axis AX of rotation of main rotor 14 and the gear teeth 32 thereof extend through an opening 36 communicating with the bore 19. Each tooth 32 of each star rotor 16, 18 successively engages a groove 25 in main rotor 14 as the latter is rotatably driven by the motor and in cooperation with the wall of the bore 19.

Figure 2:
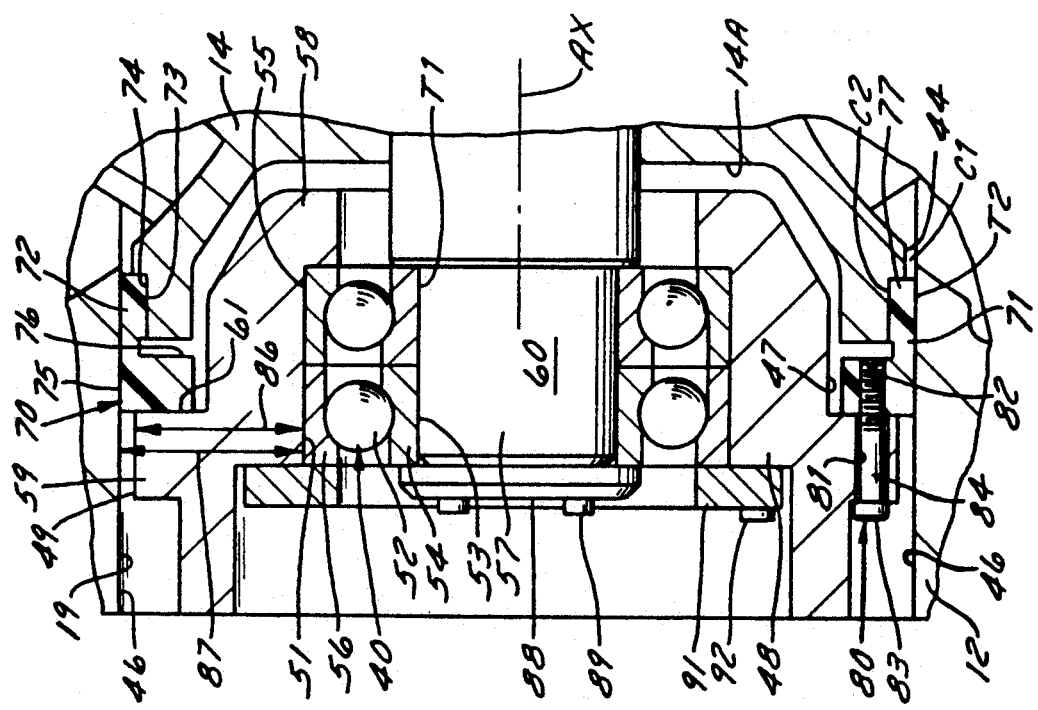
FIG. 2 is an enlarged cross-sectional view of the bearing and seal assembly shown in FIG. 1.

The bearing and seal assembly 40 supports the rotor for concentric rotation about the axis AX and the seal 70 of the assembly separates the high pressure from the low pressure side of the compressor. Referring particularly to FIG. 2, the rotor 14 has an outermost circumferential surface 44 machined to provide a running gap clearance C1 between the inner peripheral surface 46 of the rotor receiving bore 19 and the outer circumferential surface 44. The bearing and seal assembly 40 includes a nonrotatable support means that comprises a bearing support member 48 having a hub portion 58 and a rim portion 59, the outer peripheral surface 49 of which is dimensioned to loosely fit inside of the inner peripheral surface 46 of the rotor receiving bore 19 so as to be radially movable relative to the rotor axis AX. The rim portion 59 extends radially outward from the hub portion 58. A seal receiving seat 61 in the form of an axially inward facing surface is provided on the rim portion 59. The clearances are such that the outer periphery 49 of the bearing support member 48 can be used in an as-cast condition without machining. The hub 58 has an axially inner part 47 dimensioned to loosely fit inside of a radially inner flange 76 of a seal member 70 and the axially outer end 14A of rotor 14. The bearing support member 48 has a counterbore 51 machined to provide a bearing receiving portion in which a bearing member 52 is mounted. The bearing member 52 has an inner race 54 presenting an inner surface 53 which has a close tolerance fit T1 with a surface 57 of a reduced portion 60 of the rotor shaft 15.

A seal member 70 is nonrotatably mounted on the seat 61 in sealing relation thereto by means of a releasable fastening means 80 which will be more fully described hereinafter. The seal member 70 has an outer peripheral portion 71 dimensioned to have a close tolerance nonrotating sliding fit T2 with the inner peripheral surface 46 of the rotor receiving bore 19. The seal member 70 further has an inner peripheral portion 72 presenting a nonrotating sealing surface 73 dimensioned to have close a tolerance sealing gap clearance C2 with a rotating sealing surface 74 of the rotor 14 when installed. The inner peripheral portion 72 of the seal member 70 includes a radial flange 76 which extends radially inward and the outer peripheral portion 71 of the seal member 70 includes an axial flange 77 which extends axially of the bore. The nonrotating sealing surface 73 of the seal 70 is on the axial flange 77 and faces radially inward in confronting relationship with the radially outward facing rotating sealing surface 74 of the rotor 14 to provide the close tolerance sealing gap clearance C2.

As will be apparent from FIG. 2, the seal member 70 serves to support the bearing support member 48 and the rotor 14 in the rotor receiving bore 19 concentric with axis AX. The bearing and seal assembly 40 includes a releasable clamping means 80 which comprises a plurality of axial apertures 81 (only one of which is shown in FIG. 2) that extend through the rim 59 of the bearing support member 48. The releasable clamping means 80 further includes a plurality of threaded bores 82 in the seal member 70 and a plurality of cap screws 83 each having a shank 84 dimensioned to be loosely received in the apertures 81 of the bearing support member 48 to provide a degree of radial play therebetween. The threaded portion of each cap screw 83 is receivable in the threaded bore 82 of the seal member. The bearing support member 48 has a radial dimension at 86 that is less than the radial dimension 87 between the radially outer portion 55 of the bearing member 52 and the inner peripheral surface 46 of the bore to permit radial adjustment of the rotor and its axis to locate the rotating sealing surface 74 of the rotor 14 in a position of concentricity with regard to the nonrotating sealing surface 73 of the seal 70.

The novel bearing and seal assembly 40, constructed as above described, enables a faster, simpler and more concentrically accurate assembly than has heretofore been possible. Because the seal 70 supports the rotor 14, the rotor 14, bearing support 48, bearings 52 and seal 70 can be preassembled outside of the compressor to place sealing surface 73 in precise concentricity with rotor sealing surface 74 prior to assembly into the compressor bore 19. More specifically, the seal 70 is installed on the rotor 14 with the sealing surface 73 in preliminary nonconcentric relation to rotor sealing surface 74. The bearings 52 are installed in the bearing receiving portion 51 of the bearing support member 48 which is then assembled on the reduced portion 60 of the rotor 14. The inner race 54 of the bearings 52 is received on the surface 57 of reduced portion 60 of the rotor and is secured in position by an inner retainer washer 88 and cap screws 89. The outer race 56 of the bearing member 48 is held by an outer retainer 91 which is secured in place by cap screws 92. As previously explained, the rim portion 59 of the bearing support member hub 58 is provided with a plurality of axially extending apertures 81 dimensioned to loosely receive the shank 83 of cap screws 84. The cap screws 84 are passed through the enlarged axially extending apertures 81 and loosely threaded but not tightened into an associated threaded bore 82 of the seal member 70. At this stage, with the assembly still outside of the compressor bore, the bearing support member 48, the bearing 52, and the rotor 14 are free to be moved as a unit in any radial direction with respect to seal member 70 to locate the rotating rotor sealing surface 74 in a position of precise concentricity with the nonrotating sealing surface 73 of the seal. Precise concentricity between sealing surfaces 73, 74 is achieved by means of a dial indicator measuring device or a simple centering fixture and the cap screws 83 are then tightened to lock the rotor in this position and create what I term a concentric rotor/seal assembly which can be stocked as a component for subsequent use during final assembly of the compressor or as a service part.

In final assembly, the concentric rotor/seal assembly is installed in the bore 19 of the housing 12. As the rotor 14 is provided with the running clearance C1, it will fit easily into the bore 19. As the seal outer periphery portion 71 is dimensioned to present its surface 75 in a close tolerance nonrotational sliding fit T2 with bore surface 46, it is slid into the rotor receiving bore 19. The peripheral surface 49 of bearing support member 48 is dimensioned so as to be loosely received inside of inner peripheral surface 46 so it will pass easily into bore 19. As the seal outer periphery surface 75 has close tolerance fit T2 with surface 46, the concentric rotor/seal assembly is now concentric with bore 19. The previously preset concentricity of seal surface 73 with rotor surface 74 is never changed during final assembly and thus seal gap C2 remains constant and concentric with the seal to support the bearing support member 48 and associated rotor 14. The final assembly is completed by installing cover plate 24, FIG. 1.

In the embodiment shown, there is radial play for concentricity adjustment between the surfaces defining aperture 81 in the rim 59 and the shank 84 of the cap screw 83. However, this radial play could instead be provided between the inner surface 53 of the bearing race 54 and the surface 57 of reduced portion 60.

With the bearing and seal assembly above described, the seal member 70 physically supports the rotor in the position of concentricity. With this assembly, there are only four tolerance areas which must be controlled: (1) the tolerance T1 between the outer surface 57 of the rotor portion 60 and the inner surface 53 of the bearing assembly inner race 54; (2) the sealing gap clearance C2 between the rotating sealing surface 74 of the rotor 14 relative to the inner peripheral surface 73 of the seal 70; (3) the tolerance T2 between the inner peripheral surface 73 of the seal 70 relative to the outer peripheral surface 75 of the seal 70; and (4) the running clearance C1 between the outer peripheral surface 44 of the rotor 14 and the inner peripheral surface 46 of the housing bore. Because of the reduced total tolerance, the seal 70 is not required to be self-adjusting and can be made of steel or cast iron rather than aluminum. Consequently, the seal 70 will have the same coefficient of thermal expansion as that of the rotor and housing to minimize temperature induced variations in the running gap C1. At a pressure ratio of 4.1 the overall efficiency of a compressor with this seal assembly is improved by 2.2% due to the cumulative total of the tolerances being reduced from 0.010 to 0.0035. At a pressure ratio of 10.9, the overall efficiency of the compressor is increased to 7.9%. In addition, manufacturing costs are significantly reduced because of the reduced number of tolerances which must be closely held during machining. Further, the cost of assembly is significantly reduced due to the fact that the bearing support member 48 is dimensioned to loosely fit inside of the inner peripheral surface 46 of the rotor receiving bore to permit axial adjustment by the provision of loosening the cap screws 83.

The bearing and seal assembly may be used with any conventional type of bearing arrangement including combinations of bearing assemblies comprising both roller and ball bearings.

What is claimed is:

1. A bearing and seal assembly for supporting a rotor that has a rotating sealing surface, for rotation about an axis in a rotating machine of the type including a housing having a rotor receiving bore defined by an inner peripheral surface concentric with said axis within which said rotor rotates comprising:

a nonrotatable support means having,
  a bearing support member dimensioned to loosely fit inside of said inner peripheral surface of said rotor receiving bore so as to be radially movable relative to said axis,
  a bearing receiving portion on said bearing support member,
  a bearing member secured on said bearing receiving portion to rotatably mount said rotor on said bearing support member and having a radially outer portion,
  a seal receiving seat on said bearing support member, and
  a seal member nonrotatably mounted on said seat in sealing relation thereto and having an outer peripheral portion dimensioned to have a close tolerance nonrotating fit with said inner peripheral surface of said rotor receiving bore, an inner peripheral portion and a nonrotating sealing surface dimensioned to have close tolerance sealing gap with said rotating sealing surface of said rotor;

said bearing support member having a radial dimension that is less than the radial dimension between said radially outer portion of the bearing member and said inner peripheral surface of said bore to permit radial adjustment of said rotor axis to locate said rotor sealing surface in a position of concentricity with said nonrotating sealing surface of said seal; and a releasable clamping means for securing said seal on said bearing members to lock said rotor and seal surfaces together in said position of concentricity.

2. The bearing and seal assembly according to claim 1, wherein said inner peripheral portion of said seal member includes a radial flange extending radially inward and said outer peripheral portion of said seal member includes an axial flange extending axially of said bore with said nonrotating sealing surface being on said axial flange.

3. The bearing and seal assembly according to claim 1, wherein
said bearing support member includes a hub portion having a rim portion extending radially outward from said hub; and
said releasable clamping means includes a plurality of axial apertures extending axially through said rim, a plurality of threaded bores in said seal member, a plurality of cap screws each having a shank dimensioned to be loosely received in said apertures to provide radial play therebetween and a threaded portion received in said threaded bore, said radial play allowing said bearing support member to be adjusted radially relative to said seal into concentricity before said cap screws are finally tightened.

4. The bearing and seal assembly according to claim 1, wherein
said bearing support member includes a hub portion, and a rim portion extending radially outward therefrom;
said seal receiving seat includes an axially inward face surface on said rim portion; and
said seal includes an axially outward face in abutting sealing engagement with said axially inward face.

5. The bearing and seal assembly according to claim 1, wherein
said bearing means radially outer portion is nonrotatably secured in said bearing support member; and
said inner peripheral portion of said seal is dimensioned to allow said bearing support member to be shifted radially relative to said seal.

6. A bearing and seal assembly for supporting a rotor that has a rotating sealing surface, for rotation about an axis in a rotating machine of the type including a housing having a rotor receiving bore defined by an inner peripheral surface concentric with said axis within which said rotor rotates comprising:
a nonrotatable bearing support member dimensioned to loosely fit inside of said inner peripheral surface of said rotor receiving bore so as to be radially movable relative to said axis and having a seal receiving seat and a bearing receiving portion;
a bearing member secured in said bearing receiving portion to rotatably mount said rotor on said bearing support;
a seal member nonrotatably mounted on said seat in sealing relation thereto and having an outer peripheral portion dimensioned to have a close tolerance nonrotating fit with said inner peripheral surface of said rotor receiving bore, a nonrotating sealing surface dimensioned to have a close tolerance sealing gap in concentric facing relation to said rotating sealing surface of said rotor and an inner peripheral portion dimensioned to allow said bearing support member to be adjusted radially relative to said seal member to locate said rotor sealing surface in a position of concentricity with said nonrotating sealing surface; and
a releasable clamping means for securing said bearing support member on said seal member so that said seal will support and position said bearing support, bearings and rotor in said position of concentricity relative to said axis.

7. The bearing and seal assembly according to claim 6, wherein said inner peripheral portion of said seal member includes a radial flange extending radially inward and said outer peripheral portion of said seal member includes an axial flange extending axially of said bore with said nonrotating sealing surface being on said axial flange.

8. The bearing and seal assembly according to claim 6, wherein
said bearing support member includes a hub portion having a rim portion extending radially outward from said hub; and
said releasable clamping means includes a plurality of axial apertures extending axially through said rim, a plurality of threaded bores in said seal member, a plurality of cap screws each having a shank dimensioned to be loosely received in said apertures to provide radial play therebetween and a threaded portion received in said threaded bore, said radial play allowing said bearing support member to be adjusted radially relative to said seal into concentricity before said cap screws are finally tightened.

9. The bearing and seal assembly according to claim 6, wherein
said bearing support member includes a hub portion, and a rim portion extending radially outward therefrom;
said seal receiving seat includes an axially inward face surface on said rim portion; and
said seal includes an axially outward face in abutting sealing engagement with said axially inward face.

10. The bearing and seal assembly according to claim 6, wherein
said bearing member has a radially outer portion nonrotatably secured in said bearing support member; and
said inner peripheral portion of said seal is dimensioned to allow said bearing support member to be shifted radially relative to said seal.

* * * * *